US007697610B2

(12) United States Patent
Yu et al.

(10) Patent No.: US 7,697,610 B2
(45) Date of Patent: Apr. 13, 2010

(54) VARIABLE BLOCK SIZE EARLY TERMINATION FOR VIDEO CODING

(75) Inventors: Keman Yu, Beijing (CN); Jiang Li, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1536 days.

(21) Appl. No.: 10/940,168

(22) Filed: Sep. 13, 2004

(65) Prior Publication Data

US 2006/0056719 A1   Mar. 16, 2006

(51) Int. Cl.
 H04N 7/12 (2006.01)
 H04N 11/02 (2006.01)
 H04N 11/04 (2006.01)
(52) U.S. Cl. .................. 375/240.16; 375/240.12; 375/240.13; 375/240.14; 375/240.15; 382/236
(58) Field of Classification Search ............ 375/240.24, 375/240.12–240.16; 382/236, 238, 239
 See application file for complete search history.

(56) References Cited

U.S. PATENT DOCUMENTS

| 4,205,341 | A | * | 5/1980 | Mitsuya et al. | ......... 375/240.24 |
|---|---|---|---|---|---|
| 5,440,346 | A | * | 8/1995 | Alattar et al. | ......... 375/240.24 |
| 5,936,673 | A | * | 8/1999 | Agarwal | ............... 375/240.24 |
| 5,946,043 | A | | 8/1999 | Lee et al. | |
| 6,115,420 | A | | 9/2000 | Wang | |
| 6,317,459 | B1 | | 11/2001 | Wang | |
| 6,707,852 | B1 | | 3/2004 | Wang | |
| 6,901,110 | B1 | * | 5/2005 | Tsougarakis et al. | ... 375/240.12 |
| 6,968,012 | B1 | * | 11/2005 | Meggers | ................. 375/240.24 |
| 2002/0025001 | A1 | * | 2/2002 | Ismaeil et al. | .......... 375/240.16 |
| 2004/0028134 | A1 | * | 2/2004 | Subramaniyan et al. | .................... 375/240.16 |
| 2005/0025243 | A1 | * | 2/2005 | Sohn et al. | ............. 375/240.16 |
| 2005/0286777 | A1 | * | 12/2005 | Kumar et al. | ............... 382/232 |

OTHER PUBLICATIONS

Chen et al., "Fast Integer Pel and Fractional Pel Motion Estimation for JVT" JVT-F017 6th Meeting Awaji Japan Dec. 2002.
Tourapis, "Enhanced Predictive Zonal Search for Single and Multiple Frame Motion Estimation" In Proceedings of VCIP 2002 Jan. 2002 pp. 1069-1079.
Yang, et al., "Computation Reduction for Motion Search in Low Rat Video Coders" IEEE Transactions on CSVT v12 n10 Oct. 2002 pp. 948-951.
Yu, et al., "Performance Enhancement of H.263 Encoder based on zero Coefficient Prediction" In Proceedings of ACM Multimedia 1997 Nov. 1997 pp. 21-29.

(Continued)

*Primary Examiner*—Marsha D Banks Harold
*Assistant Examiner*—Chikaodili E Anyikire
(74) *Attorney, Agent, or Firm*—Lee & Hayes, PLLC (57) ABSTRACT

Systems and methods for variable block size early termination for video coding are described. In one aspect a set of thresholds are selected based on block sizes in a video encoding scheme. The thresholds include a respective threshold for each block size used by the encoding scheme. For each macroblock of multiple macroblocks in a video data sequence, blocks in the macroblock are evaluated in view of respective threshold(s) to determine if motion estimation operations can be terminated prior to evaluating remaining blocks in the macroblock.

26 Claims, 5 Drawing Sheets

OTHER PUBLICATIONS

Zhou, et al., "Method for Detecting all-Zero DCT Coefficients ahead of Discrete Cosine Transform and Quantization" Electronics Letter v.34 n319 Sep. 1998 pp. 1839-1840.

Zhu, et al., "A Novel Hexagon-Based Search Algorithm for Fast Block Motion Estimation" In Proceedings of ICASSP 2002 v3 May 2002 pp. 1593-1596.

* cited by examiner

VARIABLE BLOCK SIZE EARLY TERMINATION FOR VIDEO CODING

TECHNICAL FIELD

This disclosure relates to video coding and more particularly to video compression.

BACKGROUND

Recent years have seen rapid development of video coding techniques. Generally, compression performance is improved along with an increase of encoding cost. H.264, as the newest joint standard of the ITU-T Video Coding Experts Group (VCEG) and the ISO/IEC Moving Picture Experts Group (MPEG), has achieved a significant improvement in coding efficiency compared to previous standards, such as MPEG-1/2/4 and H.261/H.263. However, the complexity of H.264 is too high to be widely applied in real-time applications. One reason for this is due to motion estimation (ME) operations, which contribute a significant amount of encoding complexity to a video encoder.

ME is used to achieve compression between adjacent frames in a video data sequence by exploiting temporal redundancies. In a sequence of video frames, a current frame is predicted from a previous frame known as reference frame. The current frame is divided into macroblocks of a certain pixel size, which is selected as a trade-off between accuracy and encoding cost. Each macroblock is compared to a macroblock in the reference frame using some error measure, and the best matching macroblock is selected. The search is conducted over a predetermined search area. A vector denoting the displacement of the macroblock in the reference frame with respect to the macroblock in the current frame, is determined. This vector is known as motion vector There are two existing techniques used to reduce the encoding cost of ME. The first one is to speed up the algorithms themselves. For ME, numerous fast algorithms have been proposed, such as Hexagon-based Search (HBS), Enhanced Predictive Zonal Search (EPZS), and hybrid Unsymmetrical-cross Multi-Hexagon-grid Search (UM-HexagonS). Another technique to reduce the encoding cost of ME is to terminate the ME calculation early. By predicting the blocks whose discrete cosine transform (DCT) coefficients will quantize to zeros, some conventional methods effectively reduce the computations of ME. On the other hand, a significant portion of blocks have a zero motion vector after ME. Existing zero-motion detection (ZMD) algorithms detect such blocks by comparing their sum of absolute difference (SAD) with a predefined threshold and then skips the remaining search points.

Unfortunately, the conventional early termination methods such as those described above are all developed for previous coding schemes, such as H.263. They cannot be applied to H.264 longer with any success. This is because compared to H.263, where only two block sizes (16×16 and 8×8) are used, video encoding techniques may choose different block sizes, and may vary the size of the blocks within a given frame. For instance, seven block sizes varying from 16×16 to 4×4 are used in H.264.

Accordingly, systems and methods to reduce the encoding complexity of motion estimation operations in a video encoding scheme that uses different block sizes, and may vary the size of the blocks within a given frame, would be very useful.

SUMMARY

Systems and methods for variable block size early termination for video coding are described. In one aspect a set of thresholds are selected based on block sizes in a video encoding scheme. The thresholds include a respective threshold for each block size used by the encoding scheme. For each macroblock of multiple macroblocks in a video data sequence, blocks in the macroblock are evaluated in view of respective threshold(s) to determine if motion estimation operations can be terminated prior to evaluating remaining blocks in the macroblock.

BRIEF DESCRIPTION OF THE DRAWINGS

In the Figures, the left-most digit of a component reference number identifies the particular Figure in which the component first appears.

DETAILED DESCRIPTION

Overview

The following systems and methods describe variable block size early termination for video coding. These systems and methods extend existing zero-motion detection (ZMD) techniques with Variable Block-Size Zero Motion Detection (VBZMD) and Variable Block-size Best Motion Detection (VBBMD) techniques. Both of these new techniques reduce encoding costs associated with motion detection operations, as compared to the encoding costs typically incurred through the use of existing motion estimation techniques.

VBZMD or VBBMD is used in conjunction with existing fast motion search algorithms to predict the best motion vector by examining only one search point. This means that some motion estimation searches can be stopped early, and a substantial number of search points can be skipped (i.e., computations associated with these searches can be eliminated and overall encoding complexity is reduced). VBZMD and VBBMD predictions are based on a set of thresholds that are generated as a function of detection accuracy rates of different block sizes and desired encoding complexity reduction.

VBZMD and VBBMD differ from ZMD in at least the following aspects: (1) Thresholds used in VBBMD are obtained based on the detection accuracy of different block sizes respectively while complexity reduction is also considered, which makes threshold selection adaptable to the encoding technique being used and the complexity reduction desired; (2) Dual thresholds are utilized for a largest block size (e.g., 16×16), such that a lower threshold is used to skip the motion search of smaller block sizes; and (3) In VBBMD, a predicted motion point (vector), rather than the zero motion point, is used to further reduce the number of motion vectors (points) that would otherwise need to be searched For purposes of exemplary illustration, the following systems and methods are described below with respect to H.264 video coding because H.264 uses different block sizes, and may vary the size of the blocks within a given frame. However, the systems and methods can also be applied to video coding techniques other than H.264, for example, WINDOWS Media Video encoding techniques, etc. Additionally, and for purposes of discussion, the systems and methods utilize inter-frames (P frames) and integer pixel motion searches during motion estimation operations.

We now describe an exemplary system for variable block size early termination for video coding.

An Exemplary System

Figure 1:
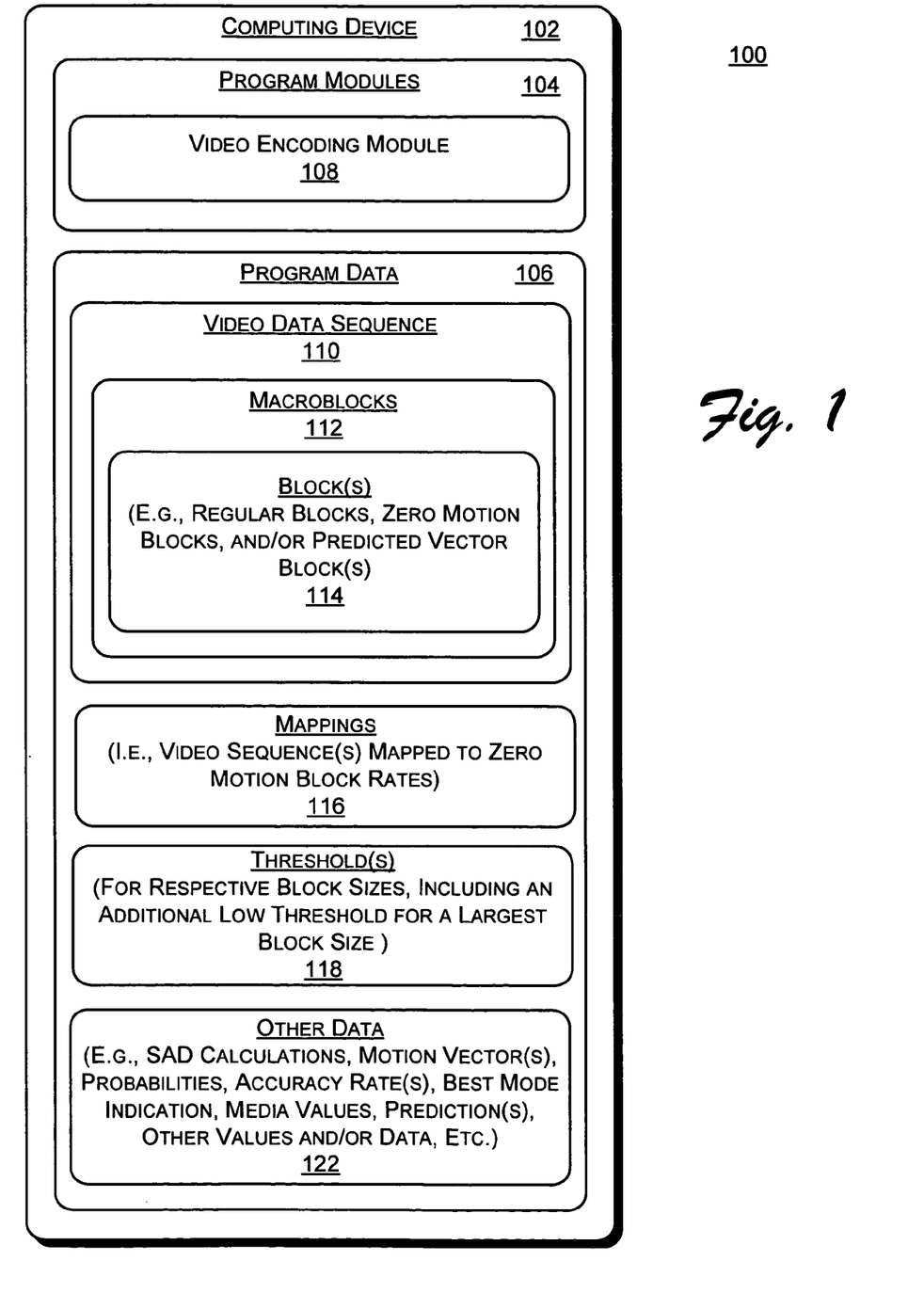
FIG. 1 shows an exemplary computing device for variable block size early termination for video coding.

FIG. 1 illustrates an exemplary system 100 for variable block size early termination for video coding. System 100 includes computing device 102, including program module(s) 104 and program data 106. Program modules 104 include, for example, video encoding module 108, which performs VBZMD and/or VBBMD operations for early termination for video coding. Program data 106 includes, for example, video data (a video data sequence) 110, mapping(s) 116, thresholds 118, and other data 122. Video data 110 is shown as being segmented into some number of macroblocks 112, each of which includes some number of blocks 114. A block may be a regular block, a zero motion block (ZMB), and/or a predicted vector block (PVB). For purposes of discussion, a regular block is a block that is not determined to be a ZMB or a PVB, as described below. Whether a block 114 in a macroblock 112 is a ZMB and/or a PVB is a function of the particular variable block size early termination for video coding scheme(s) being used—e.g., VBZMD and/or VBBMD. For instance, if VBBMD is not being used, there may not be any PVBs We now describe operational aspects of system 100 and video encoding module 108.

Variable Block-size Zero Motion Detection

For motion estimation (ME) of video data 110, H.264 incorporates seven inter-frame prediction modes with different block sizes varying from 16×16, 16×8, 8×16, 8×8, 8×4, 4×8, and 4×4. After ME, video data 110 includes some number of blocks 114 with a ZMB. The ZMBs are distributed across some combination of video data 110 with low and/or high motion activities. That is, each video data sequence 110 is mapped to a respective zero-motion block rate based on each of the respective modes, which using H.264 coding, is equal to seven modes.

TABLE 1 shows an exemplary mapping of named video data sequences mapped to zero motion block rates (%) of seven modes (QP=32).

TABLE 1

| Video Sequence (Arbitrary Names) | Mode 1 | Mode 2 | Mode 3 | Mode 4 | Mode 5 | Mode 6 | Mode 7 |
|---|---|---|---|---|---|---|---|
| Akiyo | 98.03 | 97.51 | 97.18 | 97.28 | 97.14 | 96.47 | 97.04 |
| Salesman | 96.80 | 95.92 | 95.69 | 95.15 | 94.78 | 94.13 | 94.33 |
| News | 91.90 | 91.72 | 91.98 | 92.35 | 91.93 | 91.31 | 91.78 |
| Silent | 85.01 | 84.65 | 84.15 | 85.01 | 84.75 | 84.23 | 85.06 |
| Coastguard | 32.44 | 33.51 | 32.80 | 30.91 | 31.40 | 30.71 | 31.06 |
| Foreman | 43.97 | 44.15 | 43.57 | 44.25 | 44.81 | 43.73 | 45.42 |

For purposes of illustration, mappings of sequence(s) of video data 110 to zero motion block rates are shown as mappings 116 in FIG. 1.

In existing ZMD ME techniques, when the sum of absolute differences (SAD) of a block 114 in a macroblock 112 is smaller than a given threshold, the block 114 can be regarded as a ZMB. In contrast to ZMD, H.264 uses a cost function J as the measure of error between the predicted block and the actual block) in selecting the best matching block as shown in equation (1).

$$J(m,\lambda)=SAD(s,c(m))+\lambda R(m-p) \quad (1),$$

where $m=m(m_x, m_y)^T$ is the current motion vector (MV), $p=(p_x, p_y)^T$ is the predicted MV, and $\lambda$ is a Lagrangian multiplier. $R(m-p)$ is the number of bits to code the MV.

In this implementation, if video encoding module 108 determines that a block 114 in a macroblock 112 has zero motion, the block is likely to have a small encoding cost (i.e., equation no. 1) at MV (0, 0). To determine if the block has small encoding cost, video encoding module 108 compares the calculated cost to a respective threshold 118 ($THZ_i$, where $i=1, \ldots, 7$) that is based on the block size of the block 114. There is a respective threshold 118 for each block size used in the encoding algorithm. For instance, in an implementation based on H.264 encoding, which uses seven block sizes, there are seven thresholds 118.

More particularly, during motion estimation, video encoding module 108 first examines MV (0, 0), where the vertical and horizontal motion vectors are both zero, for the current block 114. If the cost at MV (0, 0) calculated by equation (1) satisfies equation no. (2), the block is regarded as a respective ZMB and video encoding module 108 skips any remaining motion estimation searches. Equation (2) is as follows:

$$J_i<THZ_i, \text{ for } i=1, \ldots, 7 \quad (2).$$

With respect to selection of a thresholds 118 for a particular block size, preventing loss in video quality may be considered to be more important than a minor increase in complexity. Therefore zero motion detection accuracy is used as a guide in determining values for thresholds 118. In this implementation, detection accuracy is the probability of a block 114 being a ZMB when its SAD is smaller than a threshold 118. The larger the value of a threshold, the more ZMBs are detected and the more ME search points can be skipped. However, as a threshold 118 increases to indicate that more blocks 114 are ZMBs, some of the blocks 114 may be incorrectly selected, which could result in a loss in image quality. To prevent this from occurring and to provide a balanced approach, system 100 utilizes several candidate sets of thresholds 118 based on different predetermined accuracy rates.

Video encoding module 108 selects and uses an optimal set which provides a good tradeoff between quality and complexity in practice. In one implementation, criteria upon which this selection is made is based, for example, on a determination that with a same threshold, video data sequences such as "Foreman" (e.g., see TABLE 1) may exhibit both accuracy rates and detection rates in low motion scenes that are higher than those in large motion scenes. Such video sequences can represent scenes that possess relatively large motion. As such, one implementation of video encoding module 108 selects thresholds 118 based on such video sequences, which are then applied to other video data sequences 110.

TABLE 2 shows exemplary candidate thresholds 118 for different accuracy rates of the video data sequence titled "Foreman".

TABLE 2

| Accuracy | Mode 1 | Mode 2 | Mode 3 | Mode 4 | Mode 5 | Mode 6 | Mode 7 |
|---|---|---|---|---|---|---|---|
| 80% | 600 | 550 | 570 | 400 | 315 | 300 | 250 |
| 75% | 960 | 650 | 660 | 480 | 360 | 350 | 270 |
| 70% | 1650 | 920 | 890 | 600 | 410 | 400 | 300 |
| 65% | 2270 | 1200 | 1160 | 700 | 470 | 460 | 350 |
| 60% | 2800 | 1500 | 1430 | 880 | 530 | 530 | 400 |

In VBZMD, if the zero-motion cost (encoding cost as determined by equation no. 1) of a block 114 is smaller than the corresponding threshold 118, video encoding module 108 regards (0, 0) as the best motion vector of the block 114, and video encoding module 108 jumps to the next block in the same macroblock 112 to continue ME operations. If the current block 114 is the last block in a macroblock, video encoding module 108 continues its operations using any next inter-block prediction mode. After video encoding module 108 has examined all modes, the mode with the minimal sum of encoding costs of all blocks in a macroblock 112 is selected as the best mode for encoding the macroblock 112.

In mode 1, since one macroblock contains only one block 112, if the zero-motion cost is small enough, it is likely that not only (0, 0) is the best motion vector (MV), but also mode 1 is the best mode of this macroblock. Thus, we define an additional lower threshold 118 THS for mode 1. If the zero-motion cost is smaller than THS 116, the motion search of the entire macroblock is stopped. In the presented examples, and because the threshold 118 of 800 corresponds to a relatively high accuracy rate of 78% in mode 1, 800 was used as an exemplary THS 118.

Exemplary pseudo-code for determining VBZMD is shown in TABLE 3.

TABLE 3

AN EXEMPLARY VBZMD DETERMINATION

```
1
2
3
4  Assume the current macroblock is MB(x,y)
5
6  For each mode i (i = 1,...,7 ) of the MB(x,y)
7    For each block in the macroblock
8      Calculate the cost at (0,0)
9      If cost < THZ_i
10         Set MV=(0,0)
11         If mode = 1 and cost < THS
12           Set best mode = 1
13           Exit two loops
14         End if
15         Exit one loop
16      Else
17         Do the normal motion search process
18      End if
19    End for
20  End for
21
```

For purposes of example, and as shown in TABLE 4, the Akiyo sequence represents small motion scenes. Note that up to 93.47% of search points per macroblock (PPMB) are reduced while the average peak signal-to-noise (PSNR) degradation is not more than 0.05 dB and the increases of bit rates are marginal. Even for the Foreman sequence, which possesses larger facial motion and camera panning, calculations are saved and the PSNR loss is still slight. Here the number of search points is calculated at the macroblock level. For example, one search point in mode 4 with the block size of 8×8 equals to ¼ PPMB. Here, the threshold set 118 corresponding to the accuracy rate of 65% provides a good tradeoff between performance and complexity. When a set of thresholds is determined to significantly reduce the complexity while the PSNR degradation is still slight, then set of thresholds will be determined to be the appropriate set.

TABLE 4

| Sequence | Method | Accuracy | PSNR (dB) | PPMB | Bit-rate (kbps) |
|---|---|---|---|---|---|
| Akiyo | Fast ME | | 35.22 | 63.86 | 14.52 |
| | Fast ME + VBZMD | 80% | 35.18 | 29.02 | 14.65 |
| | | 75% | 35.20 | 21.41 | 14.67 |
| | | 70% | 35.19 | 7.96 | 14.70 |
| | | 65% | 35.18 | 5.17 | 14.59 |
| | | 60% | 35.17 | 4.17 | 14.67 |
| Foreman | Fast ME | | 32.90 | 160.48 | 79.34 |
| | Fast ME + VBZMD | 80% | 32.87 | 124.97 | 79.00 |
| | | 75% | 32.86 | 112.85 | 79.55 |
| | | 70% | 32.82 | 88.75 | 80.49 |
| | | 65% | 32.77 | 64.77 | 82.19 |
| | | 60% | 32.75 | 49.39 | 84.73 |

Variable Block-Size Best Motion Detection

Figure 2:
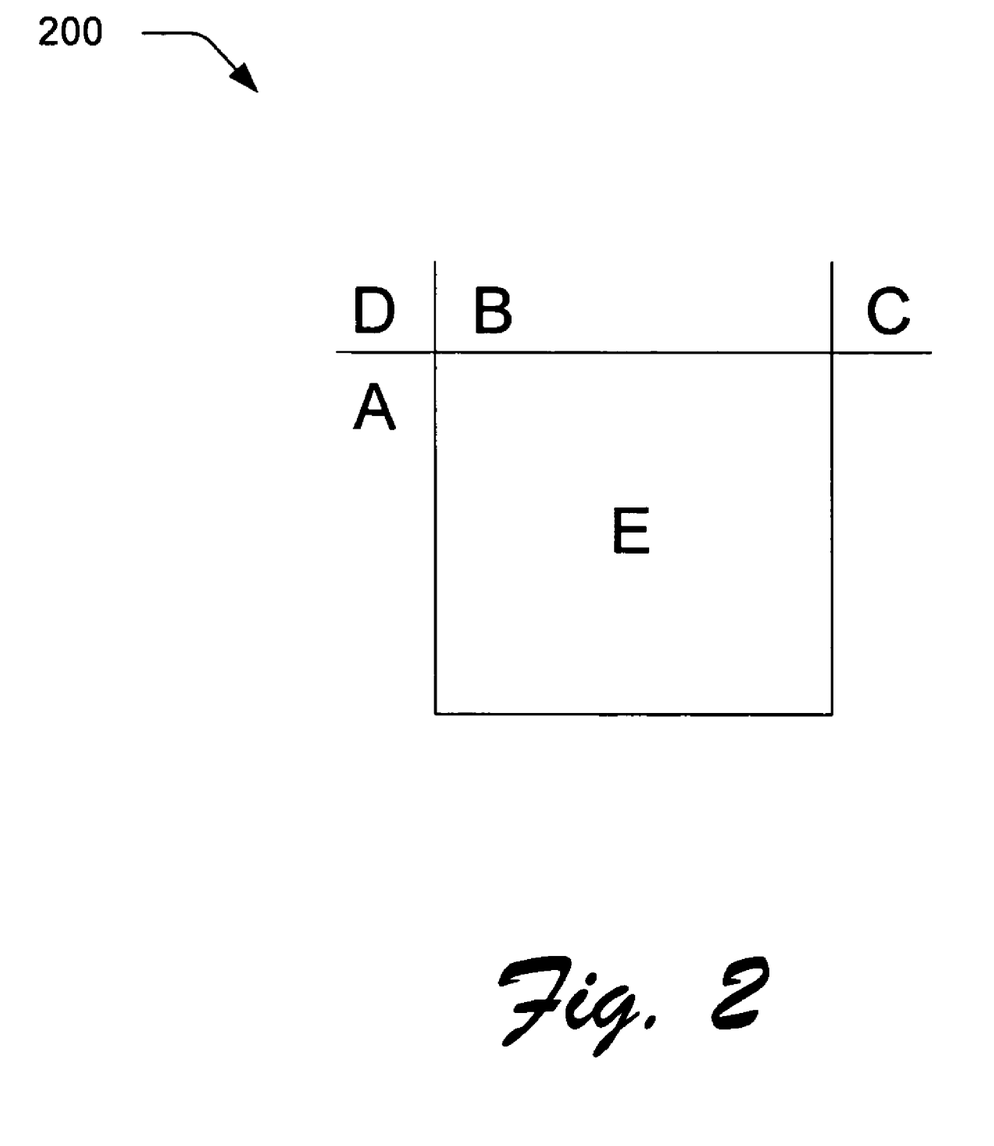
FIG. 2 shows an exemplary current block and neighboring block motion vectors for predicting a motion vector for the current block.

FIG. 2 shows an exemplary current block and neighboring block motion vectors for predicting a motion vector for the current block. Although VBZMD as described above achieves good performance on reducing computations during motion estimation operations, in one implementation, video encoding module 108 utilizes techniques for variable block size best motion detection, which achieves better performance. In this implementation, the median value of the left ("A"), top ("B") and top-right ("C") (or top-left "D") neighboring blocks' 112 motion vectors is used as the prediction of the current block's 112 (current block "E") motion vector, as illustrated in FIG. 2. Since the motion vectors of the neighboring blocks are usually correlated, the predicted vector is likely to be the best MV after ME. For the convenience of description, we define the blocks 114 whose best MV is exactly the predicted vector as predicted vector blocks (PVB) of FIG. 1. As shown in TABLE 5, the exemplary PVB rates of different video sequences 110 are consistently larger than the ZMB rates (e.g., see TABLE 1). Particularly, for scenes with relatively large motion, such as the exemplary data sequences of Coastguard and Foreman, wherein the PVB rates are higher than ZMB rates by 23% ~122%. On the other hand, it has been shown that for most sequences, more than 97% of ZMBs are also PVBs at the same time. In view of this, video encoding module 108 uses the predicted vector to predict the best MV instead of the zero MV. In addition, in H.264, the difference between the current MV and the predicted vector, rather than the current MV itself, is encoded and transmitted. Therefore, using the predicted vector to predict the best MV can save bits that are used to code MVs.

TABLE 5

| Sequence | Mode 1 | Mode 2 | Mode 3 | Mode 4 | Mode 5 | Mode 6 | Mode 7 |
|---|---|---|---|---|---|---|---|
| Akiyo | 98.05 | 97.51 | 97.23 | 97.37 | 97.27 | 96.61 | 97.24 |
| Salesman | 96.84 | 95.71 | 95.46 | 95.40 | 95.11 | 94.54 | 95.03 |
| News | 91.80 | 91.70 | 91.66 | 92.83 | 92.71 | 92.22 | 93.16 |
| Silent | 85.09 | 85.04 | 84.57 | 86.32 | 86.80 | 86.36 | 88.28 |
| Coastguard | 58.68 | 62.19 | 62.41 | 64.32 | 66.17 | 67.09 | 69.04 |
| Foreman | 54.19 | 56.26 | 55.46 | 57.79 | 60.00 | 59.15 | 63.15 |

Based on the preceding VBZMD, in one implementation, video encoding module 108 uses Variable Block-size Best Motion Detection (VBBMD to compare the cost at the predicted vector (vectors are shown as respective portions of "other data" 122) with a given threshold 118. If the cost is smaller than the threshold, the predicted vector is regarded as the best MV, and then the remaining search points are skipped.

In VBBMD, threshold 118 value selection for different block sizes is determined as follows. Using the same approach in VBZMD, we obtain several candidate sets of thresholds 118 in terms of different accuracy rates. The procedure of VBBMD is almost the same as that of VBZMD, only except for checking the predicted vector instead of the zero MV. Different video sequences 110 are encoded with the candidate threshold 118 sets, which is then used to select an optimal set of thresholds 118. For example, using the examples of TABLE 1, a set of thresholds (2500, 1500, 1400, 920, 625, 570, 500) with accuracy of 66% provides a good tradeoff between computation cost and video quality. Moreover, in these examples, the lower threshold THS 118 for mode 1 is also selected 800 because it works well. Table 6 shows exemplary results of VBBMD with the selected exemplary optimal threshold 118 set. Compared to the results of VBZMD in the same table, we can see that more search points are further reduced, while the PSNR and bit rates remain almost the same.

TABLE 5

EXEMPLARY PERFORMANCE RESULTS OF VBBMD

| Sequence | Method | PSNR (dB) | PPMB | Bit-rate (kbps) |
| --- | --- | --- | --- | --- |
| Akiyo | Fast ME | 35.22 | 63.86 | 14.52 |
| | Fast ME + VBZMD | 35.18 | 5.17 | 14.59 |
| | Fast ME + VBBMD | 35.18 | 4.17 | 14.59 |
| Foreman | Fast ME | 32.90 | 160.48 | 79.34 |
| | Fast ME + VBZMD | 32.77 | 64.77 | 82.19 |
| | Fast ME + VBBMD | 32.77 | 30.12 | 82.34 |

In the foregoing examples of TABLES 1 through 5, the thresholds are determined when quantizer parameter (QP) is set to equal 32. Different QP values result in different thresholds 118. This is because the cost value J is related to QP. In equation no. (1), J is directly related to $\lambda$, while $\lambda$ is obtained from a lookup table indexed by QP. Therefore, thresholds 118 are adjusted according to the selected QP value. When a block 114 is regarded as a PVB, the maximal difference between the current MV m and the predicted MV p in (1) is ¾ pixels, which can be encoded with 10 bits. Thus, R(m−p) is approximately set to equal ten (10). We define thresholds 118 for QP=32 to be principal thresholds, then the thresholds for other QP values can be set as the principal thresholds plus $(\lambda_{QP}-\lambda_{32})\times 10$.

Exemplary Procedures for VBZMD and VBBMD

Figure 3:
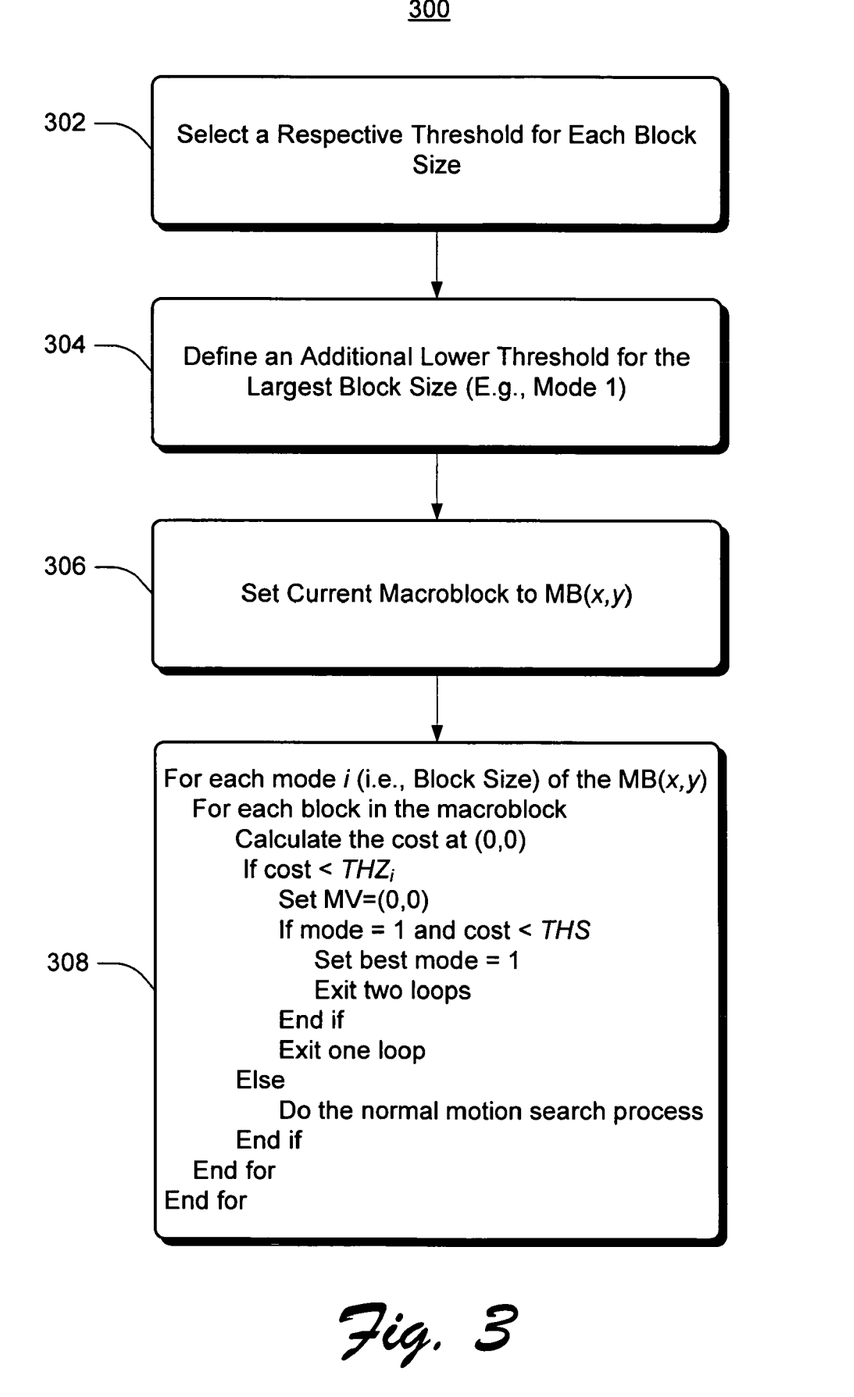
FIG. 3 shows an exemplary procedure for variable block size early termination as a function of zero motion detection for video coding.

FIG. 3 shows an exemplary procedure 300 for variable block size early termination for video coding. In this implementation, variable block size early termination for video coding is based on VBZMD. For purposes of discussion, aspects of procedure 300 are discussed with respect to the features of FIG. 1. The left-most digit of a component reference number identifies the particular figure in which the component first appears. At block 302, system 100 is used to set a threshold 118 (FIG. 1) for each block size used in the current video encoding algorithm (e.g., H.264 with seven block sizes). At block 304, an additional lower threshold for the largest block size (e.g., corresponding to mode 1) is determined.

At block 306, the current macroblock is set to MB(x, y). At block 308. the following operations are performed:

| | |
| --- | --- |
| 1 | For each mode i (i = 1,...,7 ) of the MB(x,y) |
| 2 | For each block in the macroblock |
| 3 | Calculate the cost at (0,0) |
| 4 | If cost < THZi |
| 5 | Set MV=(0,0) |
| 6 | If mode = 1 and cost < THS |
| 7 | Set best mode = 1 |
| 8 | Exit two loops |
| 9 | End if |
| 10 | Exit one loop |
| 11 | Else |
| 12 | Do the normal motion search process |
| 13 | End if |
| 14 | End for |
| 15 | End for. |

Figure 4:
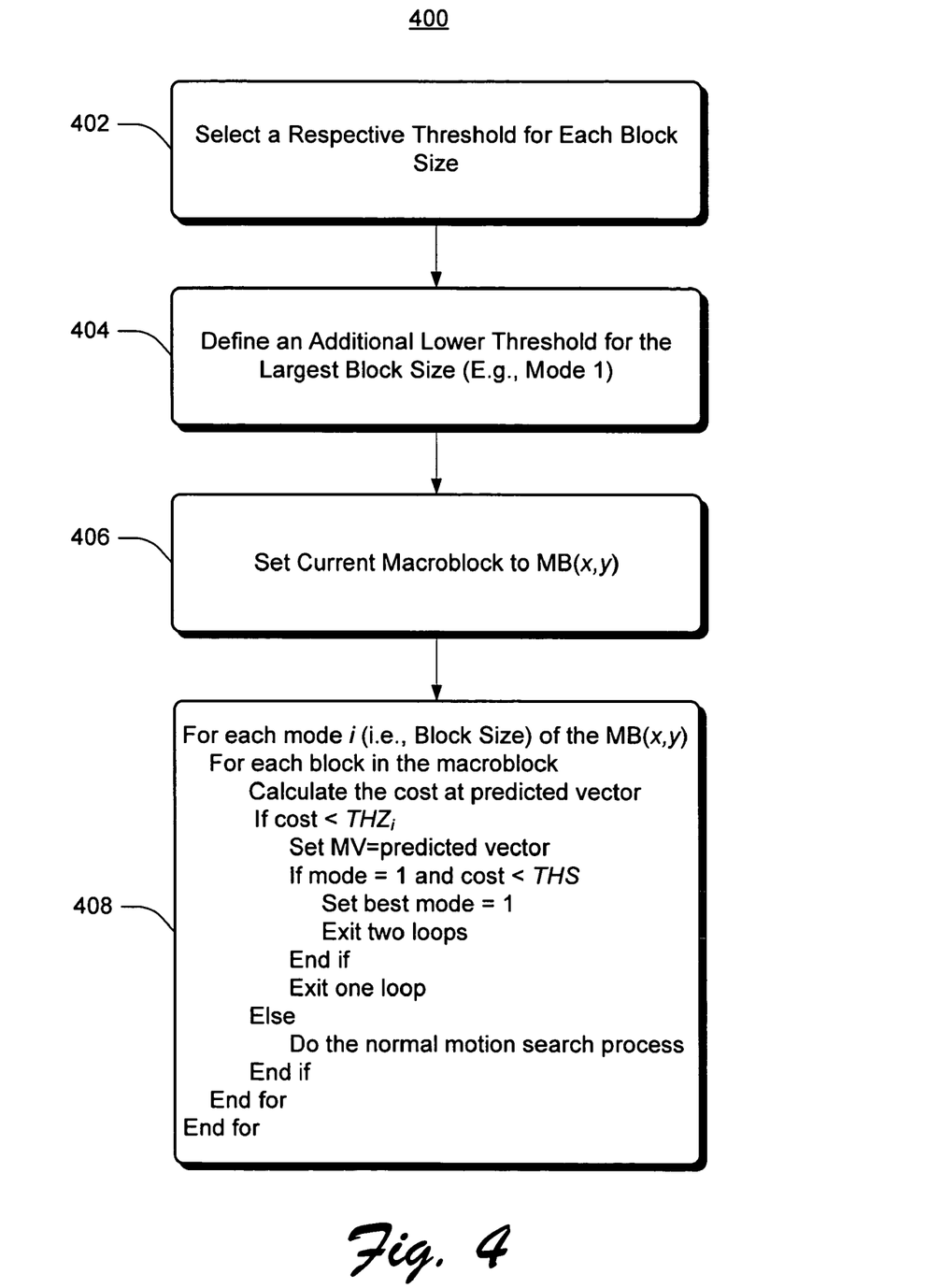
FIG. 4 shows an exemplary procedure for variable block size early termination as a function of predicted motion detection for video coding.

FIG. 4 shows an exemplary procedure 400 for variable block size early termination for video coding. In this implementation, variable block size early termination for video coding is based on VBBMD. For purposes of discussion, aspects of procedure 400 are discussed with respect to the features of FIG. 1. The left-most digit of a component reference number identifies the particular figure in which the component first appears. At block 402, system 100 is used to set a threshold 118 (FIG. 1) for each block size used in the current video encoding algorithm (e.g., H.264 with seven block sizes). At block 404, an additional lower threshold for the largest block size (e.g., corresponding to mode 1) is determined.

At block 406, the current macroblock is set to MB(x, y). At block 408. the following operations are performed:

| | |
| --- | --- |
| 1 | For each block in the macroblock |
| 2 | Calculate the cost at the predicted block |
| 3 | If cost < THZi |
| 4 | Set MV= the MV of the predicted block |
| 5 | If mode = 1 and cost < THS |
| 6 | Set best mode = 1 |
| 7 | Exit two loops |
| 8 | End if |
| 9 | Exit one loop |
| 10 | Else |
| 11 | Do the normal motion search process |
| 12 | End if |
| 13 | End for |
| 14 | End for. |

Note that in contrast to the operations of procedure 300, which utilize the (0,0) of the current block 114, lines 3 and 5 of procedure 400 are based on the predicted block 114.

An Exemplary Operating Environment

Although not required, the systems and methods for variable block size early termination for video coding are described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 5:
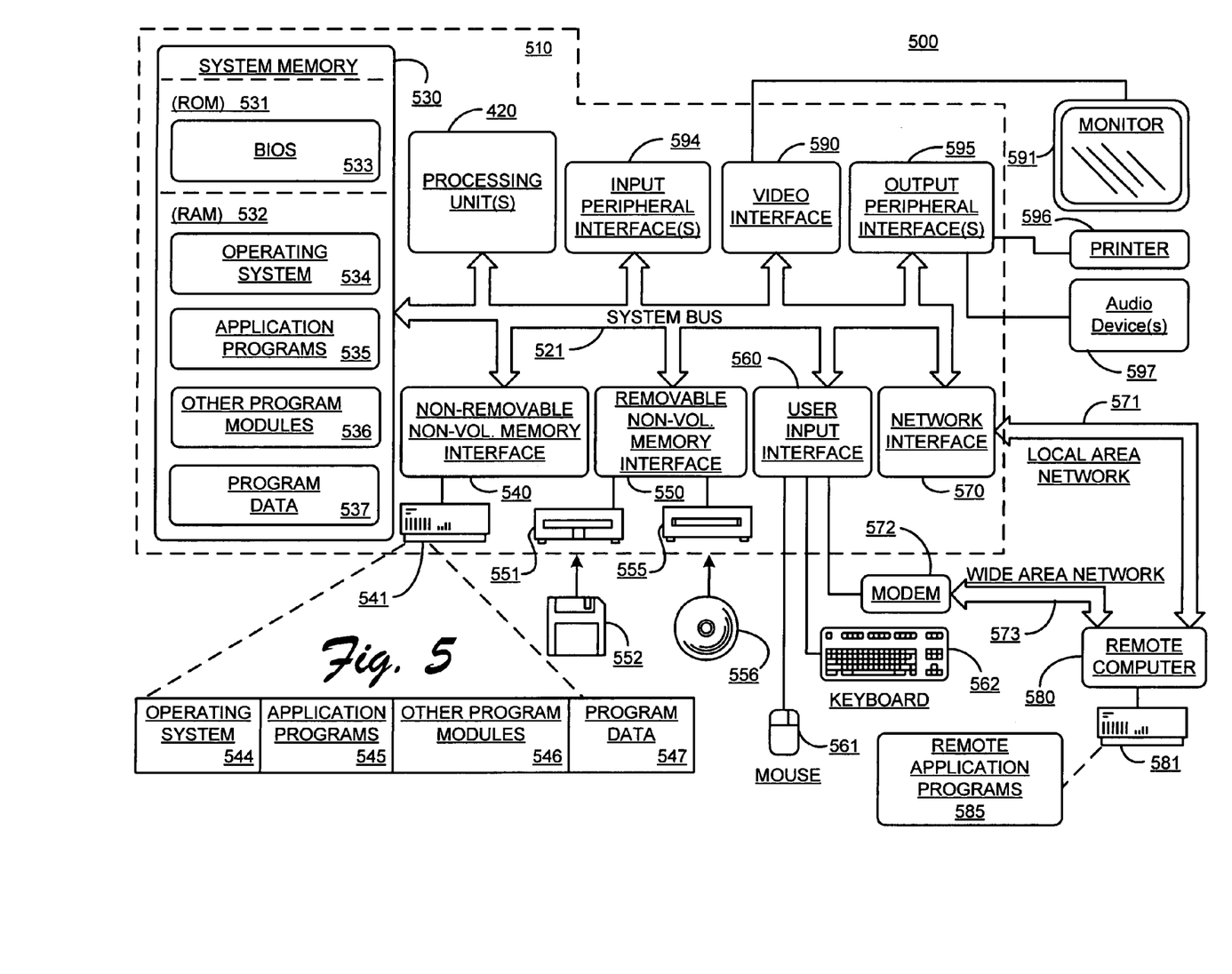
FIG. 5 illustrates an example of a suitable computing environment on which systems and methods for variable block size early termination for video coding may be fully or partially implemented.

FIG. 5 illustrates an example of a suitable computing environment for variable block size early termination for video coding may be fully or partially implemented. Exemplary computing environment 500 is only one example of a suitable computing environment and is not intended to suggest any limitation as to the scope of use or functionality of systems and methods the described herein. Neither should computing environment 500 be interpreted as having any dependency or requirement relating to any one or combination of components illustrated in computing environment 500.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 5, an exemplary system for variable block size early termination for video coding includes a general purpose computing device in the form of a computer 510 implementing, for example, system 100 of FIG. 1. The following described aspects of computer 510 are exemplary implementations of client computing device 102 of FIG. 1. Components of computer 510 may include, but are not limited to, processing unit(s) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 510 typically includes a variety of computer-readable media. Computer-readable media can be any available media that can be accessed by computer 510 and includes both volatile and nonvolatile media, removable and non-removable media. By way of example, and not limitation, computer-readable media may comprise computer storage media. Computer storage media includes volatile and nonvolatile, removable and non-removable media implemented in any method or technology for storage of information such as computer-readable instructions, data structures, program modules or other data. Computer storage media includes, RAM, ROM, EEPROM, flash memory or other memory technology, CD-ROM, digital versatile disks (DVD) or other optical disk storage, magnetic cassettes, magnetic tape, magnetic disk storage or other magnetic storage devices.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example and not limitation, FIG. 5 illustrates operating system 534, application programs 535, other program modules 536, and program data 538.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546, and program data 548. Note that these components can either be the same as or different from operating system 534, application programs 535, other program modules 536, and program data 538. Application programs 535 includes, for example program modules 104 of FIG. 1. Program data 538 includes, for example, program data 106 of FIG. 1. Operating system 544, application programs 545, other program modules 546, and program data 548 are given different numbers here to illustrate that they are at least different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. In addition to the monitor, computers may also include other peripheral output devices such as speakers 598 and printer 596, which may be connected through an output peripheral interface 595.

The computer 510 operates in a networked environment using logical connections to one or more remote computers, such as a remote computer 580. The remote computer 580 may be a personal computer, a server, a router, a network PC, a peer device or other common network node, and as a function of its particular implementation, may include many or all of the elements described above relative to the computer 510, although only a memory storage device 581 has been illustrated in FIG. 5. The logical connections depicted in FIG. 5 include a local area network (LAN) 581 and a wide area network (WAN) 583, but may also include other networks. Such networking environments are commonplace in offices, enterprise-wide computer networks, intranets and the Internet.

When used in a LAN networking environment, the computer 510 is connected to the LAN 581 through a network interface or adapter 580. When used in a WAN networking environment, the computer 510 typically includes a modem 582 or other means for establishing communications over the WAN 583, such as the Internet. The modem 582, which may be internal or external, may be connected to the system bus 521 via the user input interface 560, or other appropriate mechanism. In a networked environment, program modules depicted relative to the computer 510, or portions thereof, may be stored in the remote memory storage device. By way of example and not limitation, FIG. 5 illustrates remote application programs 585 as residing on memory device 581. The network connections shown are exemplary and other means of establishing a communications link between the computers may be used.

CONCLUSION

Although the systems and methods for variable block size early termination for video coding have been described in language specific to structural features and/or methodological operations or actions, it is understood that the implementations defined in the appended claims are not necessarily limited to the specific features or actions described. For instance, although the systems and methods have been described with respect to the H.264 encoding scheme, the systems and methods can be used with any fast motion estimation algorithm. Accordingly, the specific features and operations are disclosed as exemplary forms of implementing the claimed subject matter.

The invention claimed is:

1. A method implemented, at least in part, by one or more processors executing instructions stored in computer-readable storage media, the method comprising:

determining, by one or more of the processors, a plurality of candidate sets of thresholds, each candidate set of thresholds containing multiple different thresholds corresponding to multiple different block sizes in a video encoding scheme that uses multiple different block sizes, each candidate set of thresholds comprising a respective different threshold for each different block size of the multiple block sizes used by the video encoding scheme, each candidate set of thresholds corresponding to a different predetermined zero motion detection accuracy rate in relation to an amount of video encoding complexity reduction;

selecting one of the sets of thresholds from the plurality of candidate sets based on the predetermined zero motion detection accuracy rate and a corresponding desired video encoding complexity reduction for carrying out motion estimation operations on a video sequence;

defining a low threshold in addition to the selected set of thresholds, the low threshold being defined based on a largest block size of the multiple block sizes by the video encoding scheme, the low threshold corresponding to a higher zero motion detection accuracy rate than the selected set of thresholds; and for each macroblock of multiple macroblocks in the video data sequence, evaluating, by one or more of the processors, blocks in the macroblock in view of respective ones of the thresholds to determine whether motion estimation operations can be terminated prior to evaluating remaining blocks in the macroblock, wherein the evaluating further comprises, for each block size of the multiple block sizes, starting with a largest block size and progressing to smaller block sizes:

calculating an encoding cost of a current block based on a motion vector of the current block;

comparing the encoding cost of the current block to a threshold of the selected set of thresholds corresponding to the size of the current block to determine if the current block is a zero motion block (ZMB);

when a result of the comparing the encoding cost of the current block to the threshold corresponding to the block size of the current block indicates that the current block is a ZMB and when the current block is the largest block size of the multiple block sizes, comparing the encoding cost to the low threshold defined based on the largest block size of the multiple block sizes to determine if a best block size is the largest block size, and when the encoding cost is less than the low threshold, determining that the largest block size is the best block size for encoding the macroblock and terminating motion evaluation of the macroblock;

when a result of the comparing the encoding cost to the threshold corresponding to the block size of the current block indicates that the current block is a ZMB and the current block size is not the largest block size of the multiple block sizes, moving on to evaluate a next block in the macroblock; and when a result of the comparing the encoding cost to the threshold corresponding to the block size of the current block indicates that the current block is not a ZMB, and after each block in the macroblock has been evaluated for all block sizes for the multiple block sizes, selecting the block size with a minimal sum of encoding costs of all blocks in the macroblock as the best block size for encoding the macroblock.

2. A method as recited in claim 1, wherein evaluating the blocks further indicates that motion estimation operations can be terminated prior to evaluating all blocks in any un-evaluated macroblock of the macroblocks when the best block size has been determined to be the largest block size.

3. A method as recited in claim 1, wherein calculating the encoding cost of the block is based on a zero motion vector (0, 0) of the block.

4. A method as recited in claim 1, wherein calculating the encoding cost of the block is based on a predicted motion vector of the block.

5. A method as recited in claim 1, wherein reduction in video encoding complexity is determined based at least in part on reduction of search points per macroblock.

6. A method as recited in claim 1, wherein, prior to the selecting, a plurality of different video sequences having different amounts of motion are encoded with the candidate sets of thresholds for determining an optimal candidate set of thresholds as the selected set of thresholds based on accuracy rates determined from the video sequences having differing amounts of motion.

7. Computer-readable storage media having stored thereon computer-program instructions executable by a processor, the computer-program instructions, when executed by one or more computers, direct the one or more computers to perform a method, the method comprising:

selecting a selected set of thresholds from among a plurality of candidate sets of thresholds based on a zero motion detection accuracy rate for carrying out motion estimation operations on a video data sequence, each candidate set of thresholds containing multiple different thresholds corresponding to multiple different block sizes in a video encoding scheme that uses multiple different block sizes, the selected set of thresholds containing multiple different thresholds corresponding to the multiple different block sizes in the video encoding scheme that uses the multiple different block sizes, the selected set of thresholds comprising a respective different threshold for each different block size of the multiple block sizes used by the encoding scheme, the selected set of thresholds corresponding to a predetermined zero motion detection accuracy rate;

for each macroblock in the video data sequence, evaluating blocks in the macroblock in view of respective ones of the thresholds of the selected set of thresholds to determine whether motion estimation operations can be terminated prior to evaluating remaining blocks in the macroblock, the evaluating comprising for each block size of the multiple block sizes, starting with a largest block size and progressing to smaller block sizes:

calculating an encoding cost of a current block;

comparing the encoding cost of the current block to a corresponding threshold of the selected set of thresholds, the corresponding threshold corresponding to the block size of the current block to determine if the block is a zero motion block (ZMB);

when the block is a ZMB, and the current block size is a largest block size of the multiple block sizes, comparing the encoding cost to a low threshold to determine if a best block size is the largest block size, the low threshold being defined based on the largest block size of the block sizes and corresponding to a higher zero motion detection accuracy rate than the selected set of thresholds; and when the encoding cost is less than the low threshold, determining that the largest block size is the best block size for encoding the macroblock and terminating motion estimation operations prior to evaluating remaining blocks in the macroblock and remaining block sizes of the multiple block sizes.

8. The computer-readable storage media as recited in claim 7, wherein after each block in the macroblock has been evaluated for all block sizes for the multiple block sizes, selecting the block size with a minimal sum of encoding costs of all blocks in the macroblock as the best block size for encoding the macroblock.

9. The computer-readable storage media as recited in claim 7, wherein the instructions for selecting the set of thresholds further comprise instructions for selecting the set of thresholds as a function of zero motion detection accuracy as a tradeoff with reduction in video encoding complexity, as determined based at least in part on reduction of search points per macroblock.

10. The computer-readable storage media as recited in claim 7, wherein the instructions for selecting the set of thresholds further comprise instructions for selecting the set of thresholds as a function of detection accuracy rates of different block sizes and target encoding complexity reduction.

11. The computer-readable storage media as recited in claim 7, wherein the instructions for selecting the set of thresholds further comprise instructions for:

identifying a largest block size of the block sizes; and creating the low threshold to skip motion search of block(s) of smaller size that the largest block size; and wherein a block of the blocks, the block being of the largest block size, is associated with dual thresholds, the dual thresholds comprising the low threshold and one of the thresholds of the selected set of thresholds corresponding to the largest block size.

12. The computer-readable storage media as recited in claim 7, wherein the instructions for calculating the encoding cost of the block are based on a zero motion vector (0, 0) of the block.

13. The computer-readable storage media as recited in claim 7, wherein the instructions for calculating the encoding cost of the block are based on a predicted motion vector of the block.

14. The computer-readable storage media as recited in claim 7, wherein the instructions for selecting the set of thresholds include encoding a plurality of different video sequences having different amounts of motion with the plurality of candidate sets of thresholds for determining an optimal candidate set of thresholds as the selected set of thresholds based on accuracy rates determined from the video sequences having differing amounts of motion.

15. A computing device comprising:

a processor; and a memory coupled to the processor, the memory comprising computer-program instructions executable by the processor and comprising instructions for:

selecting a selected set of thresholds from among a plurality of candidate sets of thresholds for carrying out motion estimation operations on a video data sequence, each candidate set of thresholds containing multiple different thresholds corresponding to multiple different block sizes in a video encoding scheme that uses multiple different block sizes, the selected set of thresholds containing multiple thresholds corresponding to the multiple block sizes in the video encoding scheme that uses the multiple block sizes, the selected set of thresholds comprising a different respective threshold for each different block size of the multiple block sizes used by the video encoding scheme, wherein the selecting the set of thresholds from among the plurality of candidate sets of thresholds is based on zero motion detection accuracy rates of the different block sizes in relation to target encoding complexity reduction; and for each macroblock of multiple macroblocks in a video data sequence, evaluating blocks in the macroblock in view of respective ones of the thresholds for corresponding block sizes to determine if motion estimation operations can be terminated prior to evaluating remaining blocks in the macroblock and remaining block sizes of the multiple block sizes wherein the instructions for selecting the set of thresholds further comprise instructions for:

identifying a largest block size of the block sizes; and creating a low threshold to skip motion search of block(s) of smaller size that the largest block size; and wherein a block of the blocks, the block being of the largest block size, is associated with dual thresholds, the dual thresholds comprising a low threshold and one of the thresholds of the selected set of thresholds corresponding to the largest block size, the low threshold being defined based on the largest block size of the block sizes and corresponding to a higher zero motion detection accuracy rate than the selected set of thresholds.

16. A computing device as recited in claim 15, wherein the instructions for evaluating the blocks further indicate that motion estimation operations can be terminated prior to evaluating all blocks in any un-evaluated macroblock of the macroblocks.

17. A computing device as recited in claim 15, wherein the instructions for selecting the thresholds further comprise instructions for determining the thresholds as a function of zero motion detection accuracy and related reduction in video encoding complexity, wherein the reduction in video encoding complexity is determined based at least in part on reduction of search points per macroblock.

18. A computing device as recited in claim 15, wherein the instructions for evaluating the blocks further comprise instructions for:
   for each block size:
   calculating an encoding cost of a block;
   comparing the encoding cost to a threshold of the thresholds, the threshold corresponding to the block size to determine if the block is a zero motion block (ZMB); and
   if the block is a ZMB, comparing the encoding cost to a low threshold that is based on a largest block size of the block sizes to determine if a best block size is the largest block size, the low threshold corresponding to a higher zero motion detection accuracy rate than the selected set of thresholds.

19. A computing device as recited in claim 18, wherein the instructions for calculating the encoding cost of the block are based on a zero motion vector (0, 0) of the block.

20. A computing device as recited in claim 18, wherein the instructions for calculating the encoding cost of the block are based on a predicted motion vector of the block.

21. A computing device as recited in claim 18, wherein the instructions for selecting the set of thresholds include encoding a plurality of different video sequences having different amounts of motion with the candidate sets of thresholds for determining an optimal candidate set of thresholds as the selected set of thresholds based on accuracy rates determined from the video sequences having differing amounts of motion.

22. A computing device as recited in claim 18, wherein the instructions for comparing the encoding cost to the low threshold, if the encoding cost meets the criteria of comparison, further comprise instructions for:
   indicating that a best block size is the largest block size; and
   terminating motion estimation searching operations for the video data sequence.

23. A computer program product comprising one or more computer-readable storage media having computer-readable program instructions embodied therein, the computer-readable program instructions configured to be executed to perform a method for efficient motion estimation operations in a video encoding scheme that utilizes different size blocks, the method comprising:
   determining a selected set of thresholds from a plurality of candidate sets of thresholds, each candidate set of thresholds containing multiple different thresholds corresponding to multiple different block sizes in a video encoding scheme that uses multiple different block sizes, the selected set of thresholds containing multiple thresholds corresponding to the multiple different block sizes in the video encoding scheme that uses the multiple different block sizes, the selected set of thresholds comprising a respective different threshold for each different block size of the multiple block sizes used by the video encoding scheme, the selected set of thresholds corresponding to a predetermined zero motion detection accuracy rate;
   evaluating whether to terminate motion-estimation operations of remaining unevaluated blocks in a macroblock of multiple macroblocks, the evaluating being performed as part of the video encoding scheme that utilizes the multiple different size blocks, wherein the evaluating comprises performing the following for each block of blocks in the macroblock of multiple macroblocks until a calculated encoding cost of a block a particular block size is less than an associated respective particular threshold of the set of thresholds corresponding to the particular block size:
   calculating, for a current block of a particular block size, an encoding cost as a measure of error between a predicted block and an actual block of blocks;
   selecting a respective particular threshold of the set of thresholds based on the particular block size of the current block;
   comparing the calculated encoding cost for the current block to the selected respective particular threshold to determine whether to terminate the motion estimation operation.

24. A computer program product as recited in claim 23, wherein the evaluating of the particular threshold of the set of thresholds further comprises generating the set of thresholds as a function of zero motion detection accuracy rates of different block sizes and desired encoding complexity reduction.

25. A computer program product as recited in claim 23, wherein the method further comprises, for a largest block size, determining whether to terminate a motion estimation operation by utilizing dual thresholds, the dual thresholds comprising a low threshold and one of the thresholds of the set of thresholds corresponding to the largest block size, the low threshold being defined based on the largest block size of the block sizes and corresponding to a higher zero motion detection accuracy rate than the set of thresholds.

26. A computer program product as recited in claim 25, wherein the determining further utilizes the low threshold of the dual thresholds.

* * * * *